Feb. 12, 1929. 1,701,944

G. BEST

MANUFACTURE OF JUSTIFYING SPACERS OR SPACE BANDS
FOR USE IN TYPOGRAPHICAL COMPOSING MACHINES

Filed June 29, 1928

Inventor:
Gordon Best
By Thomson Kennedy Campbell
Attorneys

Patented Feb. 12, 1929.

1,701,944

UNITED STATES PATENT OFFICE.

GORDON BEST, OF HALE, ENGLAND, ASSIGNOR, BY MESNE ASSIGNMENTS, TO MERGENTHALER LINOTYPE COMPANY, OF BROOKLYN, NEW YORK, A CORPORATION OF NEW YORK.

MANUFACTURE OF JUSTIFYING SPACERS OR SPACE BANDS FOR USE IN TYPOGRAPHICAL COMPOSING MACHINES.

Application filed June 29, 1928, Serial No. 289,274, and in Great Britain November 11, 1927.

This invention relates to the manufacture of justifying spacers or spacebands such as are used in the typographical composing and casting machines known commercially under the trade mark "Linotype", and kindred machines, for the justifying of composed lines of matrices prior to the casting operation. It has for a principal object so to construct these devices as to render unnecessary much of the delicate machining and fitting which has been inherent in the manufacture of similar devices as heretofore practised, and as a consequence thereof, to correspondingly reduce the cost of production.

The spacer or spaceband (which is hereinafter referred to as a spacer only), is, as ordinarily, formed of two main parts, viz:— two oppositely wedge-shaped members, one shorter than the other and known as the stationary part and provided with ears by which it is held against movement during justification, and the second or longer member which is slidably connected to the shorter one in such manner as to enable it to be forced upwards through the composed line for effecting the justification.

Heretofore the guidance of the two members or wedges one on another has been exercised by mutually contacting inclined or dovetail surfaces, the satisfactory production of which has involved expensive machining and skilled manual labour.

In a spacer according to the present invention, the just-named surfaces are dispensed with, and the surfaces which are relied upon for effecting the necessary guidance can be produced by simpler means and with little or no skilled labour, as will be readily appreciated from the following detailed description and the drawings referred to therein.

In these drawings, which represent one of the improved spacers on a greatly enlarged scale:—

1 indicates the before-mentioned shorter wedge and 2 the longer one, both of which are secured together in relatively slidable connection, and the shorter of which is, as ordinarily, provided with ears 3 by which it is held against vertical movement during justification.

Figure 1:
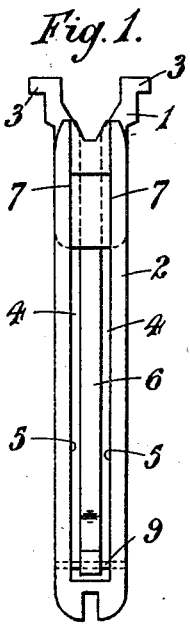
Figures 1 and 2 are relatively opposite face views, the former showing the longer member in its lowest position and the latter showing said member in a raised position.
Figure 2:
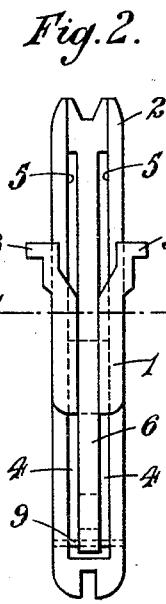
Figure 3:
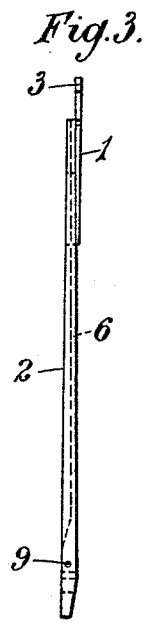
Figure 3 is an edge view of Figure 1.
Figure 4:
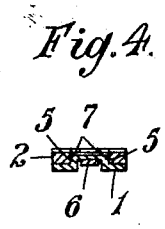
Figure 4 is a transverse section on line 4—4 of Figure 2.

The longer wedge 2 has formed in it a longitudinal central recess 4 whose two sides or boundaries 5, as shown best in Figure 4, are perpendicular to the planes of the two side faces of said wedge, and constitute surfaces which serve to guide this wedge during its movement on the companion wedge 1. Centrally within the recess 4 there is provided a tongue 6 on either side of which is a longitudinal slot bounded on the outer side by one of the aforesaid guiding surfaces 5, the said tongue at its lower end being free of, and terminating at a short distance from, the main body of the wedge 2.

Figure 5:
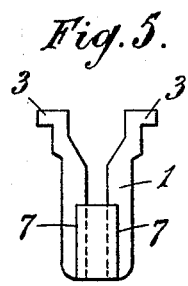

The stationary wedge 1 is so shaped as to permit the inclined surfaces (say at the front) of the adjustable wedge 2, to slide in contact with its own outer margins, and the oppositely directed or back surface of the tongue 6, as shown in Figure 4, to slide in contact with the central or sunk part of the wedge 1, offset shoulders 7, Figure 5, on this last-named wedge, serving to provide the necessary guidance for the before-mentioned guiding surfaces 5 of the wedge 2.

Figure 6:
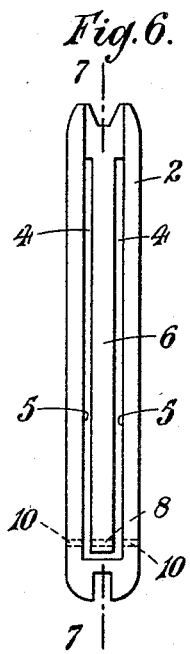
Figures 5 and 6 are face views of the two wedge-shaped members separated from each other, the faces represented being those seen in Figure 1.
Figure 7:
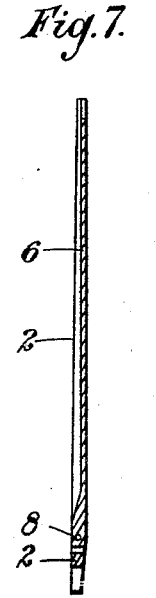
Figure 7 is a longitudinal section on line 7—7 of Figure 6.

The tongue 6 preferably is integral with the wedge 2 at its upper end and at its lower end provided with an enlargement or head transversely perforated as at 8, Figures 6 and 7, for receiving a pin 9 which will also extend through axially aligned holes 10 in the wedge 2; the head also serves as a stop for limiting the movement of the wedge 2 relatively to the wedge 1, and vice versa.

When the two wedges 1, 2, are to be assembled, the tongue 6, then free at its lower end, is pressed outwards from the common plane of the wedge 2, so as to enable the deflected middle part of the wedge 1, to be slipped beneath it into the recess 4, after which the pin 9 is inserted through the holes 8 and 10, for retaining the tongue and wedge members in permanent working relationship, the said pin, if necessary, being riveted over at its outer ends to prevent displacement.

A considerable economic advantage secured by the aforesaid construction is the interchangeability as between corresponding parts of different spacers, inasmuch as a damaged member of one spacer can be readily substituted by an undamaged corresponding member of another spacer.

Instead of the tongue 6 being integral with the wedge 2, as has been hereinbefore described as the preferred arrangement, it may be otherwise attached to it, but whatever be the construction adopted, for the purposes of this invention, the tongue is regarded as a limb or permanent member of the longer or movable wedge.

Having described my invention, I declare that what I claim and desire to secure by Letters Patent is:—

1. In a justifying spacer, the combination with a relatively stationary wedge, of a movable co-operating wedge slidably connected thereto, a recess in the movable wedge, a tongue at one end permanently attached to and at the other end free of, the movable wedge, and means connecting this free end with said movable wedge.

2. In a justifying spacer, the combination with a relatively stationary wedge, of a movable co-operating wedge slidably connected thereto, a recess in the movable wedge, a tongue at one end permanently attached to, and at the other end free of, the movable wedge, the stationary wedge overlying the movable wedge and underlying the tongue, and means connecting the free end of the tongue with the said movable wedge.

3. In a justifying spacer, the combination with a relatively stationary wedge, of a movable co-operating wedge slidably connected thereto, a recess in the movable wedge presenting guiding surfaces by which it is guided on the stationary wedge, a tongue at one end permanently attached to, and at the other end free of, the movable wedge, and means connecting this free end with said movable wedge.

4. In a justifying spacer, the combination with a relatively stationary wedge, of a movable co-operating wedge slidably connected thereto, a recess in the movable wedge presenting guiding surfaces by which it is guided on the stationary wedge, a tongue at one end permanently attached to, and at the other end free of, the movable wedge, the stationary wedge overlying the movable wedge and underlying the tongue, and means connecting the free end of the tongue with the said movable wedge.

5. In a justifying spacer, the combination with a relatively stationary wedge having a groove, of a movable co-operating wedge slidably connected to said stationary wedge, a recess in the movable wedge, a tongue at one end permanently attached to, and at the other end free of, the movable wedge, the tongue lying within the groove, and means connecting the free end of the tongue with said movable wedge and preventing the separation of the two wedges.

6. In a justifying spacer, the combination with a relatively stationary wedge having a groove, of a movable co-operating wedge slidably connected to said stationary wedge, a recess in the movable wedge presenting surfaces by which it is guided on the stationary wedge, a tongue at one end permanently attached to, and at the other end free of, the movable wedge, the tongue lying within the groove, and means connecting the free end of the tongue with said movable wedge and preventing the separation of the two wedges.

7. In a justifying spacer, the combination with a relatively stationary wedge, of a movable co-operating wedge slidably connected thereto, a recess in the movable wedge, a tongue at one end permanently attached to, and at the other end free of, the movable wedge, the stationary wedge overlying the movable wedge and underlying the tongue, and a pin traversing the movable wedge and the free end of the tongue and preventing separation of the two wedges.

8. In a justifying spacer, the combination with a relatively stationary wedge having a groove, of a movable co-operating wedge slidably connected to said stationary wedge, a recess in the movable wedge, a tongue at one end permanently attached to, and at the other end free of, the movable wedge, the tongue lying within the groove, and a pin traversing the movable wedge and the free end of the tongue and preventing separation of the two wedges.

In witness whereof I have affixed my signature hereto.

GORDON BEST.